United States Patent Office 3,828,105
Patented Aug. 6, 1974

---

3,828,105
HAIRDRESSING COMPOSITION AND PROCESS FOR PREPARATION THEREOF
Marina Saurano, Montreuil-sous-Bois, France, assignor to Societe Alexandre, Paris, France
No Drawing. Filed Nov. 4, 1971, Ser. No. 195,806
Int. Cl. A61k 7/00
U.S. Cl. 424—70       2 Claims

ABSTRACT OF THE DISCLOSURE

A hair treatment composition comprising as essential ingredients a mixture of natural beef marrow extract and 1.8 to 2.2% by weight of cetyl ricinoleate. The beef marrow extract is produced by heating a kneaded mixture of marrow and water and separating a light yellow fraction arising upon solidification of a solid mass from the mixture, the light yellow fraction constituting the extract.

BRIEF SUMMARY OF THE INVENTION

This invention relates to a composition for the treatment of hair.

The composition is more especially intended for the treatment of hair which has been made fragile, stiff and brittle through external factors, particularly by the use of hairdressing products of powerful degreasing capacity. The composition is also intended to alleviate any defficiency of the natural oils in the scalp which are normally secreted in sufficient quantity by the sebaceous glands.

The composition according to the invention essentially comprises a mixture of cetyl ricinoleate, or the like and a natural beef marrow extract, the mixture having a synergistic effect.

The term "natural beef marrow extract" refers to a beef marrow fraction which has not undergone any chemical rearrangement and which has therefore preserved its natural properties in entirety.

I have in fact established that beef marrow, whose tonic and restorative properties are known in the art and have already been made use of in certain hair preparations loses the majority of these properties when it is subjected to physicochemical treatments for the purpose of purifying it and make certain of its constituents react with other compounds, as is the case with the known composition.

In fact, chemical processing of beef marrow impairs the cholesterol, hormones and fats in the marrow, and the creams or oils with which the thus treated marrow is combined conceal instead of strengthen the restorative properties of the marrow.

On the contrary, I have established that the synergetic combinations of cetyl ricinoleate and beef marrow results in a considerable improvement of the capillary effects of beef marrow. As a matter of fact, cetyl ricinoleate, which is a light and very oily compound makes the hair supple and insures a marked penetration of the beef marrow into the body of the hair and into the scalp, the result of which is an enhanced lubricant and regenerative action of the composition according to the invention.

This synergetic increase of the action of the combined substances is surprising, since it is not evident that if, instead of natural beef marrow, a beef marrow is substituted which has undergone a physicochemical treatment or if instead of the cetyl ricinoleate a relatively similar compound such as castor oil is used, which far from making the hair supple, makes it heavy and sticky. Also, this synergetic effect of the combination of natural beef marrow and cetyl ricinoleate was in no way predictable, since it only becomes manifest if a minimum of cetyl ricinoleate is added to the beef marrow, whereas in the hairdressing compositions in which cetyl ricinoleate has already been introduced, it is used in much larger quantities.

The invention is consequently drawn to a composition for the treatment of the hair, comprising a synergetic mixture of cetyl ricinoleate and natural beef marrow extract.

The proportion of cetyl ricinoleate is approximately 1.8 to 2.2% by weight of the amount of beef marrow used.

In one preferred embodiment of the composition according to the invention, various essential oils having known qualities per se in the realm of hair hygiene and care can be advantageously combined with the synergetic mixture of cetyl ricinoleate and natural beef marrow extract. For the storage of the composition according to the invention, anti-oxidants and fungicidal products can also be incorporated into the composition of the invention. Bleached beeswax can also be introduced thereinto for hardening the mixture and imparting luster to the hair.

The composition according to the invention also offers special advantages when it is used when coloring the hair. It is, in fact, known that the products used for hair coloring generally produce harmful effects on the hair. The composition according to this invention counteracts such drawbacks. In this case, the coloring is applied to the hair, which is immediately rinsed without any shampoo or other washing, and the hairdressing composition according to the invention is then applied without delay, strand by strand.

This composition is very beneficial when the user is giving a permanent wave, since it acts slowly on the hair and thoroughly penetrates the same throughout the entire hairdressing phase.

The hairdressing composition according to the invention is prepared by mixing its various constituents by methods known per se but the phase of separating the natural extract entering into this composition from the beef marrow is an intrinsic part of the invention.

This separating process consists essentially in mixing beef marrow and water thoroughly at a warm temperature, by kneading, allowing the mass to decant and cool so as to yield a solid lump and an aqueous phase which latter is poured away, and finally separating from the solid lump a light yellow portion which made its appearance during the solidification and which constitutes the natural extract used in the composition according to the invention. The remaining marrow fraction can undergo the same treatment two or three more times until the marrow is wholly refined, using a fresh quantity of pure water each time.

More specifically the water and marrow are brought into contact in unequal amounts (for example, one volume of marrow to two of water). The mixture is then heated to about 75° C., and lightly stirred to facilitate the melting of the marrow.

The warm mixture is then kneaded, for example by means of a small grinder, and the mixture is then decanted and cooled so as to yield finally a muddy liquid phase and a solid lump in which the light yellow refined portion constitutes the marrow extract used in this invention.

DESCRIPTION OF A PREFERRED EMBODIMENT

By way of non-limitative example, a preferred formulation for the composition according to the invention is given hereafter:

1 kg. natural beef marrow extract
18 to 22 g. cetyl ricinoleate
10 to 14 g. bleached beeswax 7 to 9 g. of a methyl propyl benzyl paraoxybenzoate complex (commercially known as Nipaester Combination No. 82,121) as a fungicide 0.4 to 0.6 g. butylated hydroxytoluene (trade name BHT) as an anti-oxidant preservative product Essential Oils:
   8 to 11 g. natural lavender oil
   7 to 10 g. balsam of Tolu essence
   8 to 12 g. vervain essence
   0.75 to 2 g. essence of basil
   1 to 3 g. bergamot oil
   0.3 to 1 g. thyme oil

What is claimed is:

1. A hairdressing composition comprising a natural beef marrow extract obtained by mixing one part by volume of beef marrow with two parts by volume of water at a warm temperature of about 75° C. by kneading, separating by decanting a solid phase and a liquid phase, separating from the solid phase, a light yellow portion formed therein and constituting a natural extract and 1.8–2.2% by weight of cetyl ricinoleate.

2. A composition as claimed in claim 1 further comprising
   10 to 14 g. bleached beeswax
   7 to 9 g. of a methyl propyl benzyl paraoxybenzoate complex as a fungicide
   0.4 to 0.6 g. butylated hydroxytoluene as an anti-oxidant preservative product
   8 to 11 g. natural lavender oil
   7 to 10 g. balsum of Tolu essence
   8 to 12 g. vervain essence
   0.75 to 2 g. essence of basil
   1 to 3 g. bergamot oil and
   0.3 to 1 g. thyme oil.

References Cited

UNITED STATES PATENTS

| | | | |
|---|---|---|---|
| 2,345,006 | 3/1944 | Ross et al. | 260—410.9 R |
| 3,052,607 | 9/1962 | Hirsh | 424—365 |

FOREIGN PATENTS

| | | | |
|---|---|---|---|
| 1,021,806 | 12/1952 | France | 424—70 |

STANLEY J. FRIEDMAN, Primary Examiner

U.S. Cl. X.R.

424—95

UNITED STATES PATENT OFFICE
CERTIFICATE OF CORRECTION

Patent No. 3,828,105  Dated Aug. 6, 1974

Inventor(s) Marina Saurano

It is certified that error appears in the above-identified patent and that said Letters Patent are hereby corrected as shown below:

In the Heading, after "Ser. No. 195,806" the following should be added: -- Claims priority, application France, November 4, 1970, 7039676 --.

Signed and sealed this 1st day of April 1975.

(SEAL)
Attest:

RUTH C. MASON
Attesting Officer

C. MARSHALL DANN
Commissioner of Patents
and Trademarks